No. 682,351. Patented Sept. 10, 1901.
C. C. CHESNEY & W. J. LLOYD.
FREQUENCY INDICATOR.
(Application filed May 25, 1901.)
(No Model.)
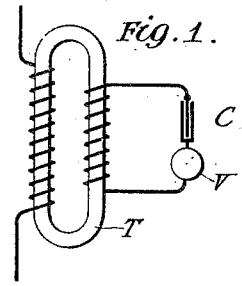
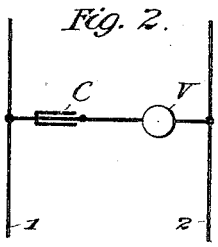
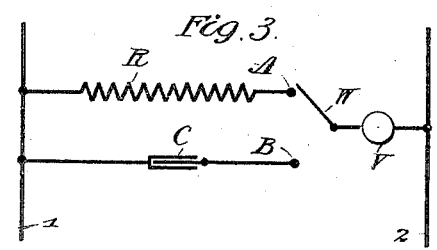
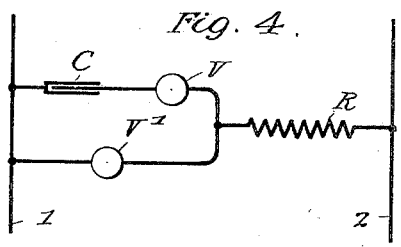
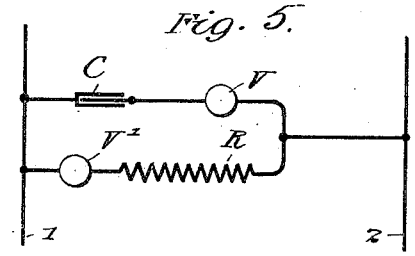
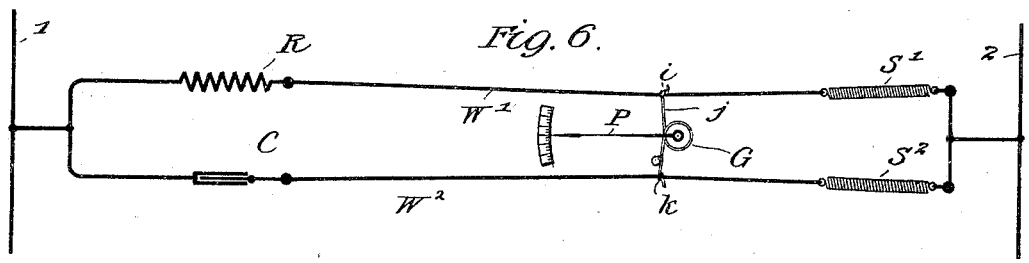
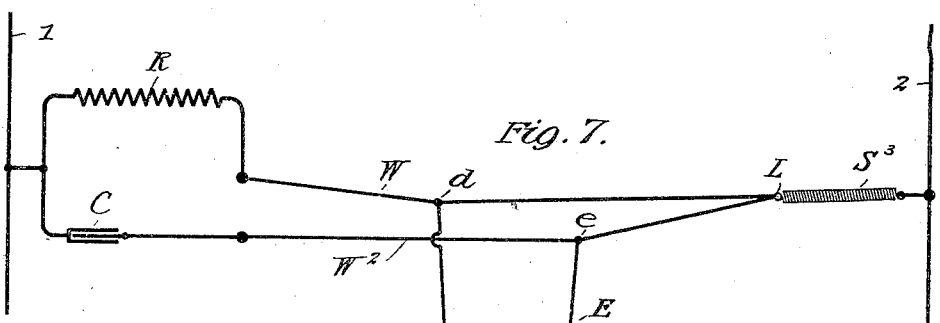
WITNESSES:
INVENTORS:
Cummings C. Chesney
William J. Lloyd.
BY
ATTORNEY
THE NORRIS PETERS CO., PHOTO-LITHO., WASHINGTON, D. C.

UNITED STATES PATENT OFFICE.

CUMMINGS C. CHESNEY AND WILLIAM J. LLOYD, OF PITTSFIELD, MASSACHUSETTS.

FREQUENCY-INDICATOR.

SPECIFICATION forming part of Letters Patent No. 682,351, dated September 10, 1901.

Application filed May 25, 1901. Serial No. 61,856. (No model.)

*To all whom it may concern:*

Be it known that we, CUMMINGS C. CHESNEY and WILLIAM J. LLOYD, citizens of the United States, residing at Pittsfield, Berkshire county, Massachusetts, have invented a certain new and useful Frequency-Indicator, of which the following is a full, clear, and exact description.

Our invention relates to apparatus for indicating the frequency of alternating currents in which the frequency shall be indicated by an index moving relatively to a scale or dial which is preferably graduated in periods per second or in revolutions per minute of the dynamo or other source of current.

The object of our invention is to secure a simple and accurate frequency-indicator which can be used to determine the frequency of the current in both constant-current and constant-potential systems.

The following is a description of the apparatus embodying our invention and illustrated in the accompanying drawings, in which—

Figure 1 shows the simplest form as applied to a constant-current system. Fig. 2 shows a similar form applied to a constant-potential system. Figs. 3, 4, and 5 show the simplest form of instrument with additions which increase its efficiency; and Figs. 6 and 7 show an instrument with still further additions which increase its efficiency and accuracy.

The principle upon which this invention is based is that in an electric circuit containing a device having capacity or self-induction the amount of energy flowing through the circuit varies with a varying frequency—that is, other things being constant, in a circuit having capacity the amount of energy passing increases as the frequency increases, while in a circuit having self-induction the amount of energy passing decreases as the frequency increases. The changes in frequency produce changes in impedance. Making use of these laws we place either a device having capacity, such as a condenser, or a device having self-induction, such as a self-induction coil, in series with an indicating device which preferably is not affected by the frequency alternation—such, for instance, as the well-known hot-wire indicating device.

It will be easily seen that if a condenser is placed in series with such an indicating device and the two are connected to a source of electric current it will result that as the frequency increases the volume of current passing through these two devices will increase, and vice versa, so that the pointer of the indicating device will have a greater deflection for a higher frequency and a lesser deflection for a lower frequency. If the voltage of the constant-potential system varies, the indications of the simple arrangement above referred to will vary for that reason also, and it will be necessary to determine the voltage of the system and calculate what part of the deflection is due to increased frequency and what part is due to change in voltage or to provide means for eliminating the error. This can be done by using either the same or a separate indicating device or by employing a differential arrangement. In the first case means are provided for connecting the indicating device alternately across the mains through suitable resistances and the energy-controlling device, and in the second case an additional indicating device is permanently connected, so as to make the readings easily taken. The necessity for taking these separate readings and making the computation can be avoided by using a differentiating arrangement, whereby the tendency to deflection caused by change in voltage opposes the tendency to deflection caused by the variation in frequency and voltage combined, giving a resultant which shall be the deflection which would be due to change in frequency alone.

Referring now more particularly to the drawings, Fig. 1 shows the combination used for a constant-current circuit, consisting of a transformer T in series with the translating devices in whose secondary is located the condenser C and the indicating device V in series with one another. In this arrangement the energy passing varies as the square of the frequency, because the electromotive force of the secondary of the series transformer varies as the frequency, and the current drawn by the condenser varies as the applied electromotive force and as the frequency. This being the case the scale of the indicating device can be easily graduated, so that each deflection shall indicate the variations in frequency.

Fig. 2 shows the simplest form of instrument as applied to a circuit of constant potential, 1 and 2 being the constant-potential mains, C the condenser, and V the indicating device in series with each other and in shunt across the mains. In this case the energy passing through the condenser and indicating device varies directly as the frequency, and the scale of the indicating device should be graduated accordingly.

Fig. 3 shows a combination for circuits of variable voltage. In this arrangement C is the condenser and V is the indicating device, while R is a non-inductive resistance, W being a switch by which the indicating device can be connected in series either with the resistance or with the condenser. In this arrangement the instrument would be calibrated for a standard voltage and a standard frequency, the non-inductive resistance and the condenser being so related to one another that at the standard frequency and standard voltage readings of the indicating device would be the same when it was connected, so as to be in series with the condenser or with the non-inductive resistance. In using the device readings would be taken by connecting the switch to the terminal A of the non-inductive resistance and then the terminal B of the condenser, and the frequency would be determined by dividing the reading when connected with B by the reading when connected with A and multiplying the result by the standard frequency.

Figs. 4 and 5 show modifications of Fig. 3, using two indicating devices instead of one and using no switch. In Fig. 4 the condenser C and indicating device V are in multiple arc with the second indicating device V', the two multiple-arc branches being in series with preferably the non-inductive resistance R. In the arrangement of Fig. 5 the condenser C and indicating device V are in one branch circuit, while the indicating device V' and resistance R are in another branch circuit.

Fig. 6 shows an instrument based upon the above principle in which the effect of a varying voltage is automatically compensated for and which in consequence will indicate the frequency without any computation whatsoever. The instrument consists of two wires $W'$ and $W^2$, such as are ordinarily used in a hot-wire instrument and which carry the current. These wires are in multiple arc with one another, $W'$ being in series with a resistance R and $W^2$ being in series with the condenser C, both of said wires terminating in springs $S'$ $S^2$, respectively. At the point $i$ on the wire $W'$ a silk thread $j$ is fastened. This silk thread is wound around a drum G, which is supported in jeweled bearings and carries a pointer P. After being wound around the drum the silk thread is fasted at $k$ on the wire $W^2$. The action is as follows: If both wires $W'$ and $W^2$ are carrying the same amount of current, they will expand equally, and the springs $S'$ $S^2$ will contract equally, so that there will be no disturbance of the drum or pointer. If, however, the wire $W'$ should carry more current than the wire $W^2$, and for that reason expand more, the balance of the system will be disturbed, for the spring $S^2$ will exert a greater tension through the silk thread upon the drum G, thus drawing the pointer until the system is again at equilibrium. The condenser and resistance are so adjusted that at the standard frequency equal currents flow through the wires $W'$ and $W^2$, so that there is no movement of the pointer. If, however, the frequency is below the standard, then more current will flow through the wire $W'$ than through the wire $W^2$, and the pointer will move downwardly. If the frequency is greater than the standard, then the wire $W^2$ will carry more current than the wire $W'$, and the pointer will move upwardly. If the electromotive force of the circuit is increased or diminished over or below the standard, the amount of current in the wires $W'$ and $W^2$ will be increased or diminished in each in direct proportion to the electromotive force, and in consequence the effect of this increased or diminished electromotive force is entirely eliminated. If the resistance R is an inductive resistance, as distinguished from a non-inductive resistance, the sensibility of the instrument of Fig. 6 is increased, and the scale of the instrument can be made more open, so as to be more easily read. This results from the fact that the expansion or contraction of the wires $W'$ and $W^2$ are directly in proportion to the current flowing through them, so that if the resistance be inductive instead of non-inductive an increased frequency would increase the energy passing through the condenser and decrease the energy passing through the inductance, the condenser branch and the inductance branch thus both acting on change in frequency to move the indicating pointer in the same direction and at the same time eliminate the effect of a change in electromotive force.

Fig. 7 shows another form of differentiating instrument in which the wires $W'$ $W^2$ are both connected at the point L to the same spring $S^3$. From the point $d$ on the wire $W'$ and the point $e$ on the wire $W^2$ are attached, respectively, two wires D E, which are fastened solidly to the insulated posts $d'$ $e'$. At the point $f'$ on the wire D a silk thread is fastened, which is wound around the drum G, as in Fig. 6, and connected to the point $f^2$ on the wire E. If both the wires $W'$ $W^2$ are carrying the same current, they will expand equally, and the point L will be moved along by the spring $S^3$ without moving the pointer P. If the currents are unequal, so that the wires expand unequally, the spring $S^3$ will act through them to move the pointer, so that for a greater frequency the pointer will be deflected to the right, while for a less than standard frequency it will be deflected to the left, the effect of voltage changes being eliminated, as before.

In all the instruments described it will be preferable to use the hot-wire-measuring device above referred to; but it is not absolutely essential, since other forms of indicating device can be used, due allowance being made for the effect of capacity or inductance in the various parts of the instrument. It is of course immaterial whether the moving part is the index or scale. We have therefore referred to it as the "pointer," which may perform the functions of either.

Our invention admits of various other modifications embodying the same principle.

In the apparatus shown, with the exception of that of Fig. 1, the deflection of the pointer varies with the frequency instead of with its square.

What we claim is—

1. In a frequency-indicator, the combination with an indicating device of means for producing changes in impedance when there are changes in frequency, said indicating device and means being in series with one another, substantially as described.

2. In a system of distribution by alternating currents, the combination with a source of alternating currents, of a condenser and an indicating device in series with one another and connected with said source, said indicating device depending for its operation upon the amount of energy passing through it and indicating the frequency of the current supplied by said source.

3. In a frequency-indicator, the combination of a condenser and a non-inductive indicating device in series with said condenser, substantially as described.

4. In a frequency-indicator, the combination of a condenser and a hot-wire-indicating device in series therewith, substantially as described.

5. In a frequency-indicator, the combination of two branch circuits in which energy passing increases with the voltage and which by reason of said variation exert counteracting tendencies to move a pointer in opposite directions, and means for varying the energy passing through one or both of said branches when the frequency of alternation changes.

6. In a frequency-indicator, the combination of two branch circuits in which the energy passing increases with the voltage and which by reason of said variation exert counteracting tendencies to move a pointer in opposite directions, a condenser in one of said branches and resistance in the other, substantially as described.

Signed at Pittsfield, Massachusetts, this 3d day of May, 1901.

CUMMINGS C. CHESNEY.
WILLIAM J. LLOYD.

Witnesses:
V. W. BERGENTHAL,
M. L. NICHOLS.